US009860558B2

(12) United States Patent
Zhang et al.

(10) Patent No.: US 9,860,558 B2
(45) Date of Patent: Jan. 2, 2018

(54) INTER-LAYER INTRA MODE PREDICTION

(71) Applicant: Intel Corporation, Santa Clara, CA (US)

(72) Inventors: Wenhao Zhang, Beijing (CN); Yi-Jen Chiu, San Jose, CA (US); Lidong Xu, Beijing (CN); Yu Han, Beijing (CN); Zhipin Deng, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 13/996,580

(22) PCT Filed: Sep. 28, 2012

(86) PCT No.: PCT/CN2012/082323
§ 371 (c)(1),
(2) Date: Feb. 12, 2015

(87) PCT Pub. No.: WO2014/047881
PCT Pub. Date: Apr. 3, 2014

(65) Prior Publication Data
US 2015/0163512 A1    Jun. 11, 2015

(51) Int. Cl.
*H04N 19/593*    (2014.01)
*H04N 19/159*    (2014.01)
(Continued)

(52) U.S. Cl.
CPC .......... *H04N 19/593* (2014.11); *H04N 19/11* (2014.11); *H04N 19/159* (2014.11);
(Continued)

(58) Field of Classification Search
CPC ...... B23D 63/20; H04N 19/11; H04N 19/159; H04N 19/176; H04N 19/187; H04N 19/30; H04N 19/593; Y10T 29/4973
(Continued)

(56) References Cited

U.S. PATENT DOCUMENTS

| 8,526,495 | B2* | 9/2013 | Liu | H04N 19/159 375/240.12 |
| 2006/0114993 | A1* | 6/2006 | Xiong | H04N 19/172 375/240.11 |

(Continued)

FOREIGN PATENT DOCUMENTS

| CN | 101112103 A | 1/2008 |
| CN | 101366283 A | 2/2009 |

(Continued)

OTHER PUBLICATIONS

Wu et al, Tunneling High-Resolution Color Content through 4:2:0 HEVC and AVC Video Coding Systems, 2013.*
(Continued)

*Primary Examiner* — Shan Elahi
(74) *Attorney, Agent, or Firm* — Green, Howard, & Mughal, LLP

(57) ABSTRACT

Systems, devices and methods are described including at an enhancement layer (EL) video encoder determining an intra mode for a current block of an EL frame based, at least in part, on one or more first intra mode candidates obtained from at least one of a lower level EL frame, or a base layer (BL) frame.

42 Claims, 12 Drawing Sheets

(51) Int. Cl.
  *H04N 19/176* (2014.01)
  *H04N 19/30* (2014.01)
  *H04N 19/11* (2014.01)
  *H04N 19/187* (2014.01)
(52) U.S. Cl.
  CPC ........... *H04N 19/176* (2014.11); *H04N 19/30* (2014.11); *H04N 19/187* (2014.11)
(58) Field of Classification Search
  USPC .................................................. 375/240.12
  See application file for complete search history.

(56) References Cited

U.S. PATENT DOCUMENTS

| | | | | |
|---|---|---|---|---|
| 2007/0074266 | A1* | 3/2007 | Raveendran | H04N 5/144 725/135 |
| 2007/0081586 | A1* | 4/2007 | Raveendran | H04N 5/144 375/240.1 |
| 2007/0081587 | A1* | 4/2007 | Raveendran | H04N 5/144 375/240.1 |
| 2007/0081588 | A1* | 4/2007 | Raveendran | H04N 5/144 375/240.1 |
| 2008/0111721 | A1 | 5/2008 | Reznik | |
| 2008/0111722 | A1* | 5/2008 | Reznik | H03M 7/40 341/67 |
| 2009/0074061 | A1 | 3/2009 | Yin et al. | |
| 2009/0168872 | A1 | 7/2009 | Jeon et al. | |
| 2010/0020886 | A1* | 1/2010 | Raveendran | H04N 5/144 375/240.27 |
| 2010/0080296 | A1* | 4/2010 | Lee | H04N 19/52 375/240.16 |
| 2010/0284471 | A1* | 11/2010 | Tsai | H04N 19/70 375/240.24 |
| 2011/0150078 | A1* | 6/2011 | Reznik | G06F 17/147 375/240.03 |
| 2012/0039384 | A1* | 2/2012 | Reznik | H03M 7/30 375/240.2 |
| 2012/0057310 | A1 | 3/2012 | Murakami et al. | |
| 2012/0057631 | A1* | 3/2012 | Le Leannec | H04N 19/56 375/240.16 |
| 2012/0177113 | A1 | 7/2012 | Guo et al. | |
| 2012/0201301 | A1* | 8/2012 | Bao | H04N 19/105 375/240.14 |
| 2012/0230433 | A1 | 9/2012 | Chen et al. | |
| 2012/0320969 | A1* | 12/2012 | Zheng | H04N 19/40 375/240.02 |
| 2013/0243081 | A1* | 9/2013 | Chen | H04N 19/597 375/240.02 |
| 2013/0251030 | A1* | 9/2013 | Wang | H04N 19/105 375/240.03 |
| 2013/0308707 | A1* | 11/2013 | Raveendran | H04N 5/144 375/240.24 |
| 2014/0086325 | A1* | 3/2014 | Chen | H04N 19/52 375/240.14 |
| 2014/0086328 | A1* | 3/2014 | Chen | H04N 19/52 375/240.16 |
| 2014/0247878 | A1* | 9/2014 | Xu | H04N 19/52 375/240.16 |

FOREIGN PATENT DOCUMENTS

| | | |
|---|---|---|
| CN | 101379511 | 3/2009 |
| CN | 101584217 | 11/2009 |
| KR | 10-1055738 B1 | 8/2011 |
| WO | 2006080779 | 8/2006 |

OTHER PUBLICATIONS

Xiang et al, Robust Multiview Three-Dimensional Video Communications Based on Distributed Video Coding, 2015.*
Office Action for Korean Patent Application No. 2015-7004739 dated Nov. 6, 2016.
European Search Report dated Mar. 30, 2016 for EP Patent Application No. 12885693.7.
Notice of Grant for KR Patent Application No. 2015-7004739, dated May 18, 2016, no translation available.
Hong et al., "Scalability Support in HEVC", 6. JCT-VC Meeting; 97. MPEG Meeting Jul. 14, 2011 to Jul. 22, 2011; Torino; Joint Collaborative Team on Video Coding of ISO/IEC JTC1/SC29/WG11 and ITU-T sG.16; URL:http://WFTP3.ITU.INT/AV-ARCH/JCTVC-SITE/; No. JCTVC-F90; Jul. 1, 2011; XP030009313; section 2.1.
International Search Report and Written Opinion received for PCT Patent Application No. PCT/CN2012/082323, dated Jul. 11, 2013, 9 pages.
First Office Action dated Mar. 17, 2017 for Chinese Patent Application No. 201280075461.4.
Examination Report dated Sep. 22, 2017 for European Patent Application No. 12885693.7.

* cited by examiner

400

INTER-LAYER INTRA MODE PREDICTION

BACKGROUND

High Efficiency Video Coding (HEVC), currently under development by the Joint Collaborative Team on Video Coding (JCT-VC) formed by ISO/IEC Moving Picture Expert Group (MPEG) and ITU-T Video Coding Experts Group (VCEG), is a video compression standard projected expected to be finalized in 2012. Similar to previous video coding standards, HEVC includes basic functional modules such as intra/inter prediction, transform, quantization, in-loop filtering, and entropy coding. HEVC defines a Largest Coding Unit (LCU) for a picture that is then partitioned into Coding Units (CUs) that take the form of rectangular blocks having variable sizes. Within each LCU, a quad-tree based splitting scheme specifies the CU partition pattern. HECV also defines Prediction Units (PUs) and Transform Units (TUs) that specify how a given CU is to be partitioned for prediction and transform purposes, respectively. A CU ordinarily includes one luma Coding Block (CB) and two chroma CBs together with associated syntax, and a PU may be further divided into Prediction Blocks (PBs) ranging in size from 64×64 samples down to 4×4 samples. After intra or inter prediction, transform operations are applied to residual blocks to generate coefficients. The coefficients are then quantized, scanned into one-dimensional order and, finally, entropy encoded.

HEVC also incorporates a Most Probable Mode (MPM) coding scheme for performing intra prediction of luma samples. In general, HEVC includes up to 33 directional intra prediction modes ("Intra_Angular" prediction modes or "directions") and, for a given PU being coded, intra prediction modes may be encoded based on previously-decoded neighboring PUs. For example, for a PU (or PB) of size N×N, a total of 4N+1 spatially neighboring samples may be used for prediction purposes. The Intra_Angular directional modes may be labeled by an index k ranging from 2 to 34 so that Intra_Angular[k] specifies a specific directional intra coding mode (e.g., Intra_Angular[26] corresponds to vertical intra prediction). The remaining, non-directional, intra coding modes are Intra_Planar (k=0) and Intra_DC where Intra_Planar (k=1) uses average values of two linear predictions based on four corner reference samples, and Intra_DC uses an average of reference samples for prediction.

In the conventional MPM scheme, three candidate intra coding modes for a current PU may be derived from the intra modes used in already coded PUs located adjacent to the current PU in the same picture. In general, if adjacent coded PUs are not available or not intra coded, then Intra_DC is chosen as the candidate mode for the current PU.

If adjacent, previously-coded PUs are available, are intra coded, then the candidate intra modes in the traditional MPM scheme correspond to a set of three specific intra mode candidates depending on the intra mode of the left adjacent PU (the "LeftMode") and the intra mode of the above adjacent PU (the "TopMode"). If the above adjacent PU is from another LCU, the TopMode may be set to Intra_DC. If the LeftMode is the same as the TopMode, then the three intra mode candidates are designated as follows: if LeftMode is Intra_Planar or Intra_DC, then the three candidate intra modes are Intra_Planar, Intra_DC, and Intra_Angular[26] (vertical); otherwise the three candidate intra modes are LeftMode, LeftMode-1, and LeftMode+1. On the other hand, if LeftMode and TopMode are different, then the three intra mode candidates are LeftMode and TopMode and a third candidate mode designated as follows: if neither of LeftMode or TopMode is Intra_Planar then the third candidate mode is Intra_Planar; if neither of LeftMode or TopMode is Intra_DC then the third candidate mode is Intra_DC; if neither of LeftMode or TopMode is Intra_Planar or Intra_DC then the third candidate mode is Intra_Angular[26] (vertical).

HEVC is also expected to include a Scalable Video Coding (SVC) extension. An HECV SVC bitstream includes several subset bit streams representing the source video content at different spatial resolutions, frame rates, quality, bit depth, and so forth. Scalability is then achieved using a multi-layer coding structure that, in general, includes a Base Layer (BL) and at least one Enhancement Layer (EL). This permits a picture, or portions of a picture such as a PU, belonging to an EL to be predicted from lower layer pictures (e.g., a BL picture) or from previously coded pictures in the same layer. However, in the conventional MPM scheme, only intra modes of adjacent PUs of the same layer (e.g., EL) may be employed to determine candidate intra prediction modes for a current PU.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
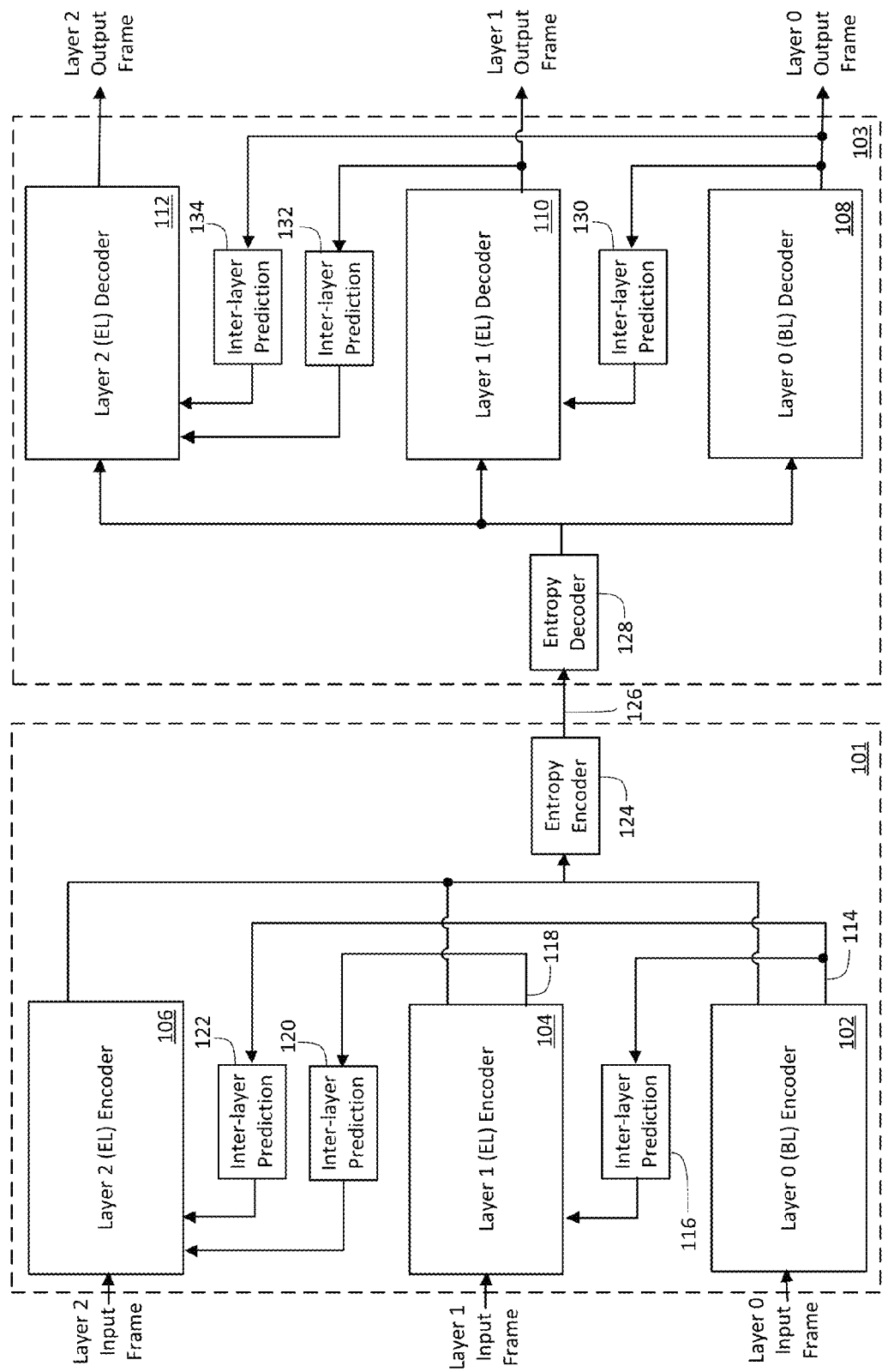
FIG. 1 is an illustrative diagram of an example video encoder system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below including operations for video coding employing inter-layer intra mode prediction.

As used herein, the term "coder" may refer to an encoder and/or a decoder. Similarly, as used herein, the term "coding" may refer to encoding via an encoder and/or decoding via a decoder. For example a video encoder and video decoder may both be examples of coders capable of coding. In addition, as used herein, the term "codec" may refer to any process, program or set of operations, such as, for example, any combination of software, firmware, and/or hardware, that may implement an encoder and/or a decoder.

In scalable video coding systems, multi-layered coding is used to support several kinds of scalabilities including spatial scalability, temporal scalability, quality scalability, bit-depth scalability and so forth. In accordance with the present disclosure, various inter-layer intra mode prediction schemes may be used to increase coding efficiency and/or coding flexibility in scalable video coding systems.

FIG. 1 illustrates an example scalable video coding (SVC) coding system 100 in accordance with the present disclosure. In various implementations, system 100 may undertake video compression and decompression and/or implement video codecs according to one or more standards or specifications, such as, for example, the High Efficiency Video Coding (HEVC) standard (see ISO/IEC JTC/SC29/WG11 and ITU-T SG16 WP3, "High efficiency video coding (HEVC) text specification draft 8" (JCTVC-J1003d7), July 2012) and any Scalable Video Coding (SVC) extension of thereof. Although system 100 and/or other systems, schemes or processes may be described herein in the context of an SVC extension of the HEVC standard, the present disclosure is not limited to any particular video encoding standard or specification or extensions thereof.

As illustrated, system 100 includes an encoder subsystem 101 having multiple video encoders including a Layer 0 or base layer (BL) encoder 102, a Layer 1 or first enhancement layer (EL) encoder 104, and a Layer 2 or second EL encoder 106. System 100 also includes corresponding video decoders of a decoder subsystem 103 including a Layer 0 (BL) decoder 108, a Layer 1 (EL) decoder 110, and a Layer 2 (EL) decoder 112. In general, the BL may be HEVC compatible coded. When coding an EL with a layer identification (ID) equal to N, SVC coding schemes provide all coding layers having a layer ID less than N for use in inter-layer prediction schemes so that a picture belonging to a particular EL may be predicted from lower layer pictures (e.g., in a BL or one or more lower layer ELs) or from previously coded pictures in the same EL.

In various implementations, HEVC specifies a Largest Coding Unit (LCU) for a picture that may then be partitioned into Coding Units (CUs) that take the form of rectangular blocks having variable sizes. Within each LCU, a quad-tree based splitting scheme specifies the CU partition pattern. HECV also defines Prediction Units (PUs) and Transform Units (TUs) that specify how a given CU is to be partitioned for prediction and transform purposes, respectively. A CU ordinarily includes one lima Coding Block (CB) and two chroma CBs together with associated syntax, and a PU may be further divided into Prediction Blocks (PBs) ranging in size from 64×64 samples down to 4×4 samples. As used herein, the term "block" may refer to any partition or sub-partition of a video picture. For example, a block may refer to a PU or to a PB.

In accordance with the present disclosure, as will be explained in greater detail below, either or both of EL encoders 104 and 106 may use intra mode candidates obtained from either encoder 102 or 104 to perform inter-layer intra mode prediction. For example, in some implementations, encoder 104 may perform inter-layer intra mode prediction using, at least in part, candidate intra modes 114 obtained from encoder 102 and processed by inter-layer prediction module 116. In addition, in some implementations, encoder 106 may perform inter-layer intra mode prediction using, at least in part, either candidate modes 114 or candidate modes 118 obtained, respectively, from encoder 102 or encoder 104 and processed, respectively, by inter-layer prediction module 120 or inter-layer prediction module 122.

As used herein the term "inter-layer intra mode prediction" refers to performing intra mode prediction for a portion of an enhancement layer picture, such as a Prediction Unit (PU), using at least one candidate mode obtained from a lower layer picture. Further, as used herein, an "intra mode candidate" refers to an intra coding mode used to either predict or to code a reference layer picture block (e.g., a PU). By reusing coding information such as one or more intra mode candidates of a reference layer, inter-layer intra mode prediction may improve the compression efficiency and coding flexibility of an SVC system, such as system 100, and/or an SVC codec design. In various implementations in accordance with the present disclosure, inter-layer intra mode prediction may be applied in any combination of temporal, spatial and/or quality scalable video coding applications.

Employing any one or more of inter-layer prediction modules 116, 120 and/or 122, encoders 102, 104 and 106 may provide separate bitstreams to an entropy encoder 124. Entropy encoder 124 may then provide a compressed bitstream 126, including multiple layers of scalable video content, to an entropy decoder 128 of decoder subsystem 103. In accordance with the present disclosure, as will also be explained in greater detail below, either or both of EL, decoders 110 and 112 may use candidate intra modes obtained from either decoder 108 or 110 to perform inter-layer intra mode prediction. For example, in some implementations, decoder 110 may perform inter-layer intra mode prediction using one or more candidate intra modes obtained from decoder 108 and processed by inter-layer prediction module 130. In addition, in some implementations, decoder 112 may perform inter-layer intra mode prediction using one or more candidate intra modes obtained, respectively, from either or both of decoder 108 and/or decoder 110 and processed, respectively, by either or both of inter-layer prediction module 132 and/or inter-layer prediction module 134.

While FIG. 1 illustrates system 100 as employing three layers of scalable video content and corresponding sets of three encoders in subsystem 101 and three decoders in subsystem 103, any number of scalable video coding layers and corresponding encoders and decoders may be utilized in accordance with the present disclosure. Further, the present disclosure is not limited to the particular components illustrated in FIG. 1 and/or to the manner in which the various components of system 100 are arranged. For instance, in various implementations, some elements of system 100 such as, for example, inter-layer prediction modules 116, 120 and 122 of encoder subsystem 101 may be implemented by a single inter-layer prediction module coupled to all three of encoders 102, 104, and 106, and so forth.

Further, it may be recognized that encoder subsystem 101 may be associated with and/or provided by a content provider system including, for example, a video content server system, and that bitstream 126 may be transmitted or conveyed to decoder subsystem 103 by various communications components and/or systems such as transceivers, antennae, network systems and the like not depicted in FIG. 1. It may also be recognized that decoder subsystem 103 may be associated with a client system such as a computing device (e.g., a desktop computer, laptop computer, tablet computer, smart phone or the like) that receives bitstream 126 via various communications components and/or systems such as transceivers, antennae, network systems and the like not depicted in FIG. 1. Further, while systems, apparatus and methods described herein may refer to performing inter-layer intra mode prediction for a block such as a PU of an EL picture, the present disclosure is not limited in this regard and inter-layer intra mode prediction may be performed for any partition of an EL picture including, for example, for a PB sub-partition of a PU.

Figure 2:
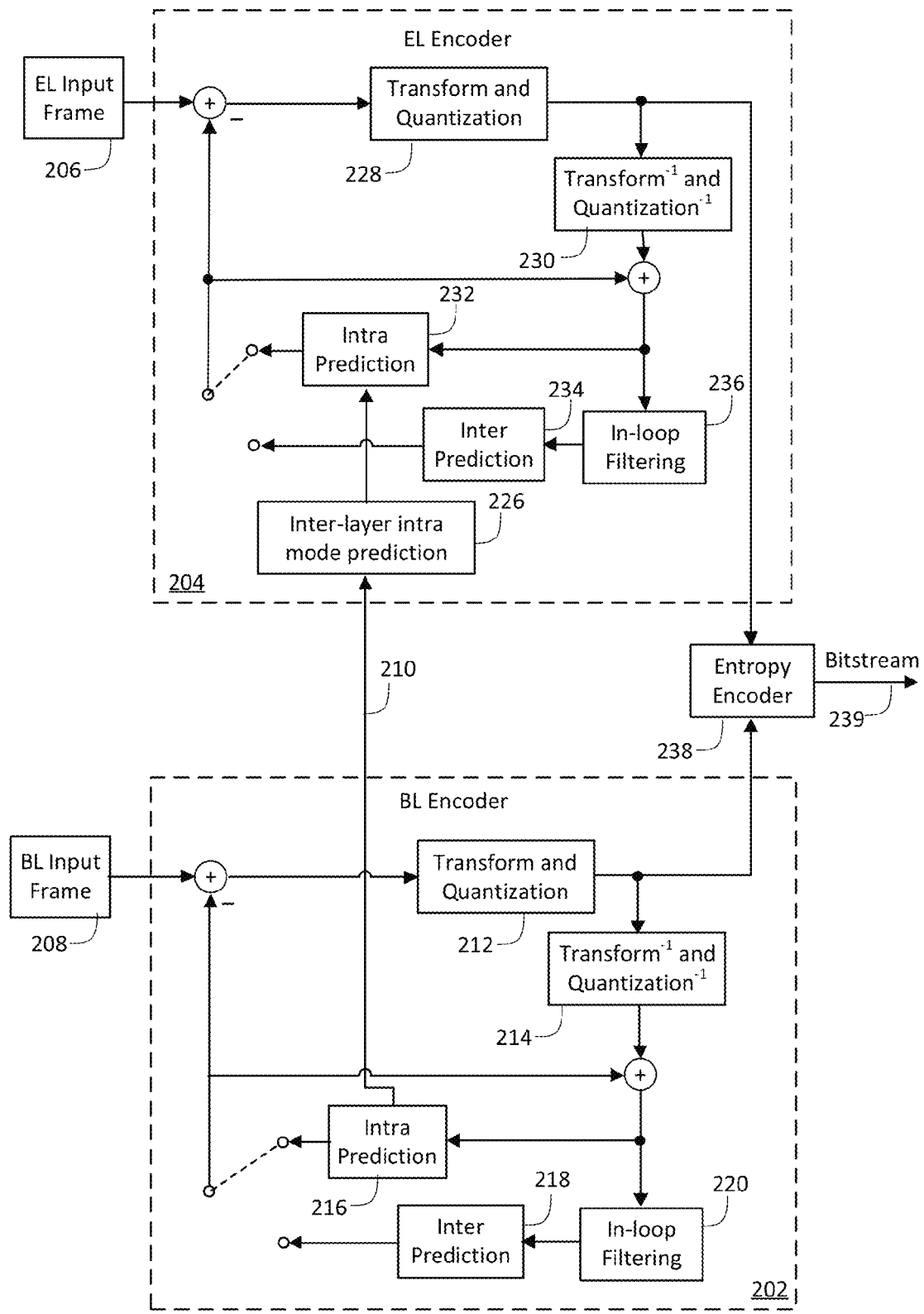
FIG. 2 is an illustrative diagram of an example encoding system.

FIG. 2 illustrates an example SVC encoding system 200 in accordance with the present disclosure. System 200 includes a reference BL encoder 202 and a target EL encoder 204 that may correspond, for example, to encoder 102 and encoder 104, respectively, of system 100. While system 200 includes only two encoders 202 and 204 corresponding to two SVC coding layers, any number of SVC coding layers and corresponding encoders may be utilized in accordance with the present disclosure in addition to those depicted in FIG. 2. For example, additional encoders corresponding to additional enhancement layers may be included in system 200 and may interact with the BL encoder 202 in a similar manner to that to be described below with respect to EL encoder 204. Further, encoder 202 may be any reference encoder such as another EL encoder at a layer lower than that of target EL encoder 204.

When employing system 200 to undertake SVC coding, a picture or image frame in the enhancement layer, such as EL input frame 206, may be predicted by EL encoder 204 from a picture such as BL input frame 208 as processed by BL encoder 202 or from other pictures in the same enhancement layer that were previously encoded by EL encoder 204. As will be described in greater detail below, when undertaking inter-layer intra mode prediction operations using system 200, intra modes of blocks in pictures in layer 204, such as EL input frame 206, may be predicted using, at least in part, one or more intra mode candidates 210 provided by BL encoder 202. As noted above, EL input frame 206 may be coded in units corresponding to one or more blocks of pixel values. Further, the coding may be applied at a slice, picture, or layer level.

Intra mode candidates 210 used for inter-layer intra mode prediction may be obtained from the processing of BL input frame 208 using a coding loop that includes a transform and quantization module 212, an inverse transform and quantization module 214, and an intra prediction module 216. In particular, when operating BL encoder 202 to perform inter-layer intra mode prediction, intra mode candidates 210 may be obtained from intra prediction module 216. BL encoder 202 may also include an inter prediction module 218 and an in-loop filtering module 220. The functionality of modules 212, 214, 218 and 220 are well recognized in the art and will not be described in any greater detail herein.

At EL encoder 204, intra mode candidates 210 provided by BL encoder 202 may be received at an inter-layer intra mode prediction module 226 of EL encoder 204 and may be used, at least in part, to predict intra coding modes for EL input frame 206 using a coding loop that includes a transform and quantization module 228 and an inverse transform and inverse quantization module 230. When operated to undertake inter-layer intra mode prediction of EL input frame 206, EL encoder 204 may not employ either of an inter prediction module 234, or an in-loop filtering module 236. The functionality of modules 228, 230, 234, and 236 are well recognized in the art and will not be described in any greater detail herein.

In various implementations either or both of BL encoder 202 and EL encoder 204 may provide compressed coefficients corresponding to coded residuals of at least some of BL input frame 208 and of at least some of EL input frame 206, respectively, to an entropy encoder module 238. Module 238 may then perform lossless compression of the residuals and provide a multiplexed SVC bitstream included the encoded residuals as output from system 200.

Figure 3:
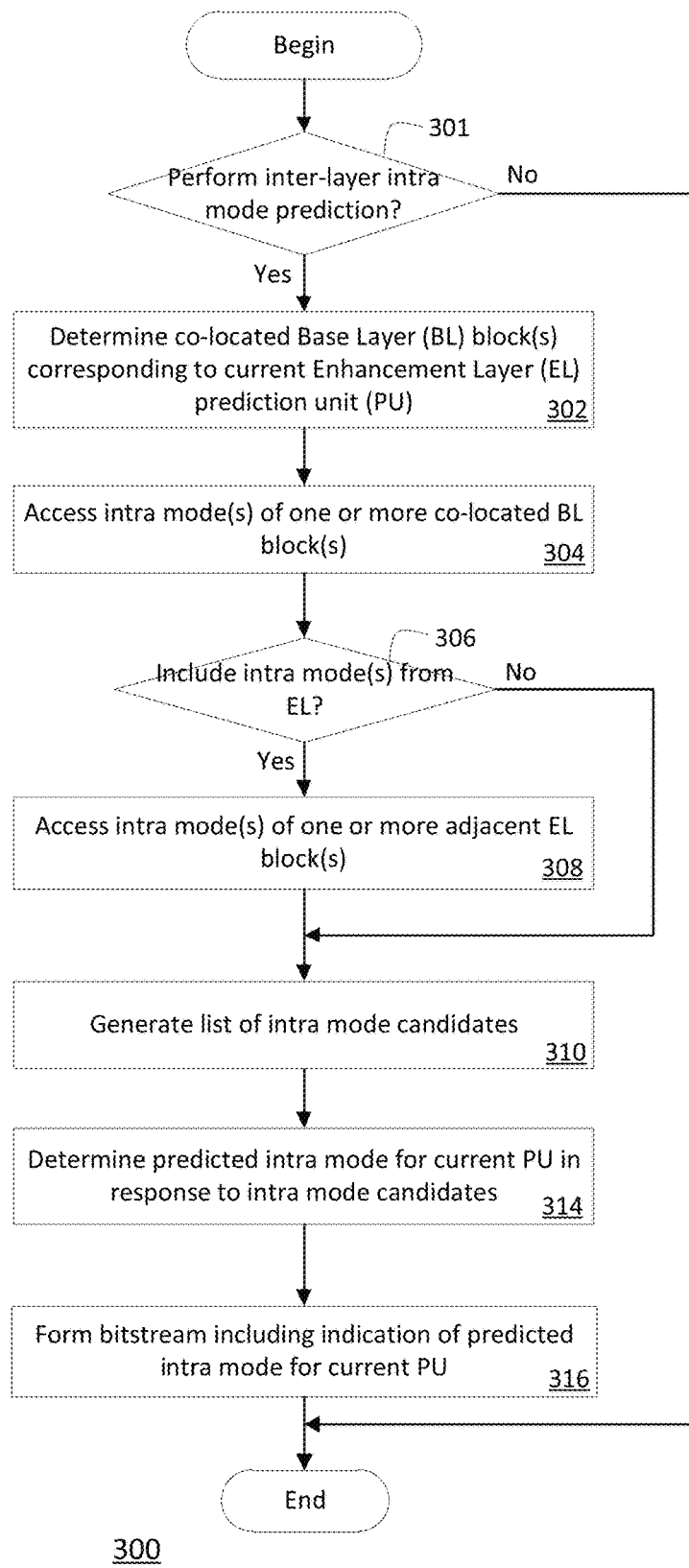
FIG. 3 is a flow diagram illustrating an example process.

FIG. 3 illustrates a flow diagram of an example process 300 according to various implementations of the present disclosure. Process 300 may include one or more operations, functions or actions as illustrated by one or more of blocks 301, 302, 304, 306, 308, 310, 312, 314 and 316 of FIG. 3. By way of non-limiting example, process 300 may form at least part of a scalable video coding process for a portion of an EL layer (e.g., a CU in this implementation) as undertaken by encoder system 200.

Figure 4:
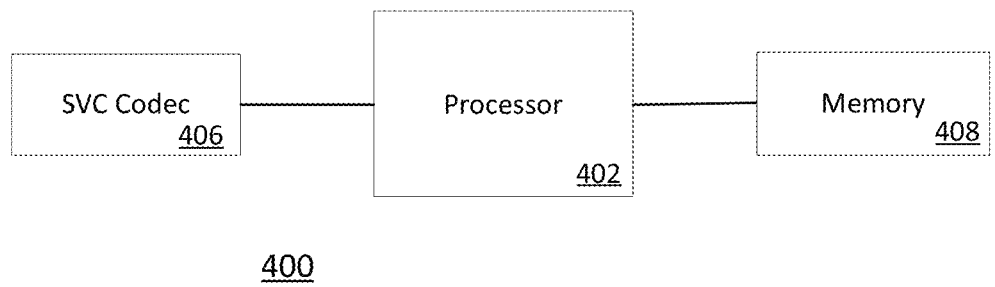
FIG. 4 is an illustrative diagram of an example system.

Further, process 300 will also be described herein in reference to coding an enhancement layer CU using the scalable video coding system 400 of FIG. 4 where system 400 includes processor 402, SVC codec module 406, and memory 408. Processor 402 may instantiate SVC codec module 406 to provide for inter-layer intra mode prediction in accordance with the present disclosure. In the example of system 400, memory 408 may store video content including at least some of BL input frame 208 and/or at least some of EL input frame 206, as well as other items such as lists of intra mode candidates and the like as will be explained in greater detail below. SVC codec module 406 may be provided by any combination of software, firmware, and/or hardware suitable for implementing coding system 200. Memory 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 408 may be implemented by cache memory.

Process 300 may begin at block 301 where a determination may be made regarding whether inter-layer intra mode prediction should be performed for a current EL PU. In various implementations, the determination of whether to perform inter-layer intra mode prediction may be based on rate-distortion cost. For example, SVC codec 406 may determine whether to perform inter-layer intra mode prediction for a PU based on known rate-distortion cost techniques. If inter-layer intra mode prediction is to be performed then process 300 may continue at block 302, if, however, inter-layer intra mode prediction is not to be performed, then process 300 may end.

Figure 5:
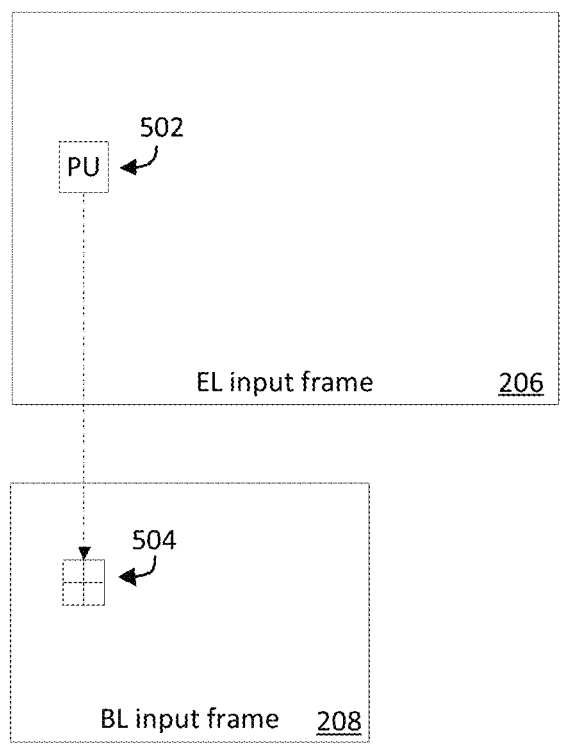
FIG. 5 is an illustrative diagram of an example coding scheme.

Process 300 may continue at block 302 where, for a current PU, one or more co-located blocks of a BL corresponding to the PU may be determined. For example, FIG. 5 illustrates a current PU 502 of EL input frame 206 where PU 502 corresponds spatially to co-located blocks 504 of BL input frame 208. In this example, PU 502 corresponds to four co-located blocks 504 of BL input frame 208. However, in various implementations, depending on the spatial scaling between an EL and a BL or lower level EL, any number of BL or lower level EL blocks may be co-located with respect to a particular EL PU. In other implementations, only a portion of a BL or lower level EL block may be co-located with an EL PU.

Further, in some scalable implementations where spatial scaling is not applied so that the EL and lower EL or BL have a spatial ratio of one (e.g., when quality scaling is applied between layers without spatial scaling) there may be a one-to-one correspondence between blocks in an EL and blocks in a lower EL or in a BL. With respect to the example of FIG. 5, determining co-located blocks at block 302 may involve marking or otherwise labeling blocks 504 as being co-located with respect to the current PU 502.

Process 300 may continue at block 304 where intra mode(s) corresponding to the co-located block(s) may be accessed. For instance, referring to FIGS. 4 and 5, block 304 may involve SVC codec 406 using processor 402 to obtain, from memory 408, intra modes corresponding to co-located blocks 504. For instance, memory 408 may act as a frame buffer for temporarily storing video content such as the portions of BL input frame 208 including intra modes of blocks 504.

Figure 6:
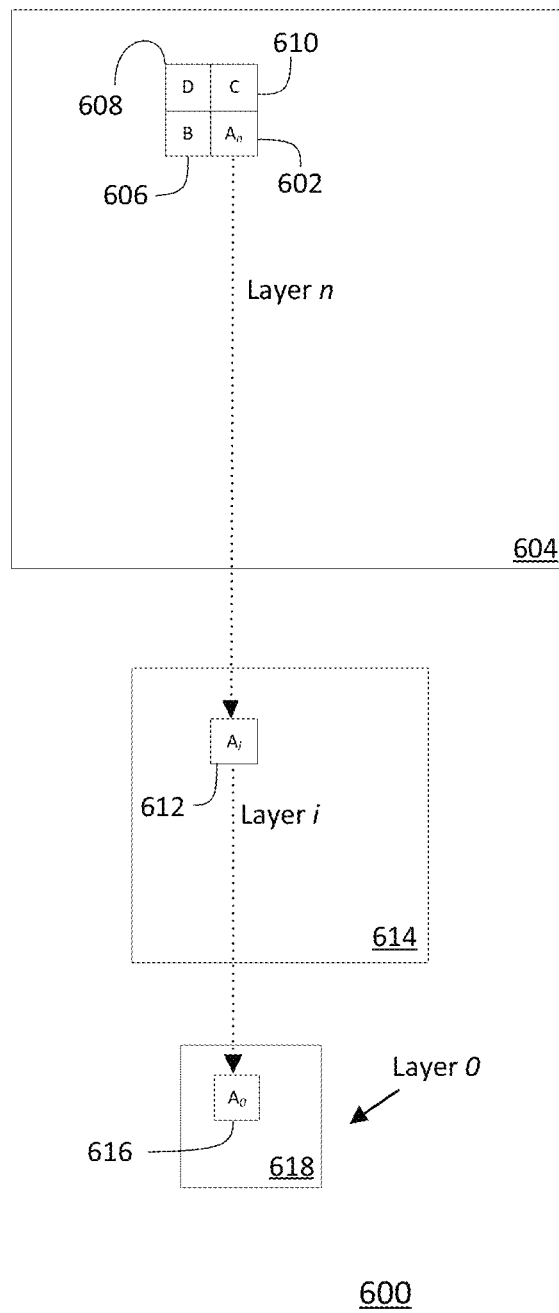
FIG. 6 is an illustrative diagram of an example coding scheme.

FIG. 6 illustrates an example inter-layer intra mode prediction scheme 600 in accordance with the present disclosure. Scheme 600 includes a current PU 602 (labeled $A_n$) of an EL picture or frame 604 having layer ID n. As depicted, scheme 600 includes three already encoded PUs 606, 608, and 610 (labeled B, D, and C, respectively) that are spatially adjacent to current PU 602 in frame 604. In addition, scheme 600 depicts a co-located block 612 (labeled $A_i$) in a lower EL picture or frame 614 having layer ID i, and a co-located block 616 (labeled $A_0$) in a BL picture or frame 618 having layer ID 0.

Returning to the discussion of FIG. 3 in the context of the example of FIGS. 4 and 6, block 304 may involve SVC codec 406 accessing intra mode(s) in memory 408 where the intra mode(s) correspond to the intra mode(s) used to code block 612 and/or block 616. For example, in some implementations, block 304 may involve accessing the intra mode corresponding to block 612 or to block 616. In other implementations, block 304 may involve accessing the intra modes corresponding to both of blocks 612 and 616. In various implementations, the intra modes corresponding to blocks 612 and/or 616 may be one of thirty-five (35) intra modes including, but not limited to, Intra_Planar, Intra_DC, and thirty-three (33) Intra_Angular modes.

Process 300 may continue at block 306 where a determination may be made regarding whether to include intra modes from the EL. In various implementations, block 306 may involve SVC codec 406 determining whether to access intra mode(s) of one or more of the spatially adjacent blocks 606, 608, and/or 610. If the result of block 306 is negative, process 300 may proceed to block 310 and intra modes may not be accessed for block(s) spatially adjacent to the current PU 602 in EL 604.

If the result of block 306 is positive, process 300 may proceed to block 308 and one or more intra mode(s) may be accessed for block(s) spatially adjacent to the current PU 602 in EL 604. For example, in some implementations, block 308 may involve accessing the intra mode(s) corresponding to one or more of blocks 606, 608 and/or block 610. In other implementations, block 304 may involve accessing the intra modes corresponding to any combination of blocks 606, 608 and/or block 610. In various implementations, the intra modes corresponding to blocks 606, 608 and block 610 may be one of thirty-five (35) intra modes including, but not limited to Intra_Planar, Intra_DC, and thirty-three (33) Intra_Angular modes.

Process 300 may continue at block 310 where a set or list of intra mode candidates may be generated. In various implementations, block 310 may involve SVC codec 406 determining a list of candidate intra modes for PU 602 based, at least in part, on the one or more intra modes accessed at block 304. In addition, in various implementations, block 310 may involve SVC codec 406 determining a list of candidate intra modes for PU 602 also based on the one or more intra modes accessed at block 308. In various implementations, the list of candidate intra modes generated at block 310 may indicate a priority associated with each intra mode candidate. For example, an intra mode associated with a layer closer to the layer including the current PU may be assigned a higher priority than an intra mode associated with a layer further from the layer including the current PU. For instance, referring to scheme 600, an intra mode associated with block 612 may be assigned a higher priority than an intra mode associated with block 616.

Figure 7:
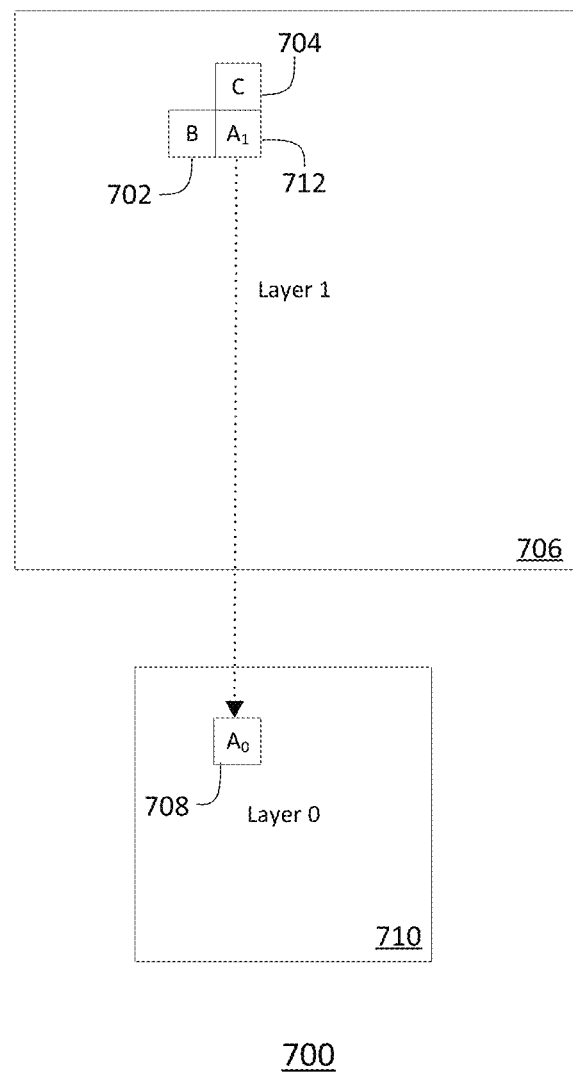
FIG. 7 is an illustrative diagram of an example coding scheme.

In various implementations, a list of candidate intra modes may be generated at block 310 by SVC codec 406 using, at least in part, a Most Probable Mode (MPM) coding algorithm. For example, FIG. 7 illustrates another example inter-layer intra mode prediction scheme 700 in accordance with the present disclosure. In scheme 700, intra modes corresponding to three blocks: two spatially adjacent blocks 702 and 704 in a first EL 706, and one co-located block 708 in a base layer 710 have been accessed at blocks 308 and 304, respectively, of process 300.

In various implementations, in the context of example scheme 700, block 310 may include employing the following example MPM algorithm to generate a list of intra mode candidates for a current PU 712 in layer 706 where "LeftMode" refers to the intra mode of left neighbor block 702, "TopMode" refers to the intra mode of top neighbor block 704, and "BaseLayerMode" refers to the intra mode of base layer block 708:

Three candidates derived from base layer, left and top neighbor blocks of current PU:
  If a neighboring block of current PU is not available or is not intra coded, set the candidate mode to Intra_DC;
  If top neighbor is from another LCU, set the candidate mode to Intra_DC (and remove the line buffer for storing the modes);
  If base layer block is not intra coded, set the candidate mode to Intra_DC.
Candidate Derivation:

---

If LeftMode = TopMode:
  If LeftMode = Intra_Planar or Intra_DC, then Cand[0]=Intra_Planar, Cand[1]=Intra_DC
  Otherwise, Cand[0]=LeftMode, Cand[1]=LeftMode-1
Otherwise
  Cand[0]=LeftMode, Cand[1]=TopMode.
If BaseLayerMode != Cand[0]&& BaseLayerMode != Cand[1]
  Cand[2]=BaseLayerMode
Otherwise
  If Cand [0] != Intra_Planar && Cand[1] != Intra_Planar, then Cand[2] = Intra_Planar
  Else if Cand[0] != Intra_DC && Cand[1] !=Intra_DC, then Cand[2] = Intra_DC
  Else, Cand[2] = Intra_Angular[26] (vertical)

---

Thus, in this example. Depending on the intra modes employed in neighboring blocks 702 and 704. The candidate list generated at block 310 may include an inter-layer candidate mode (e.g., "BaseLayerMode" corresponding to base layer block 708) obtained from another layer.

Figure 8:
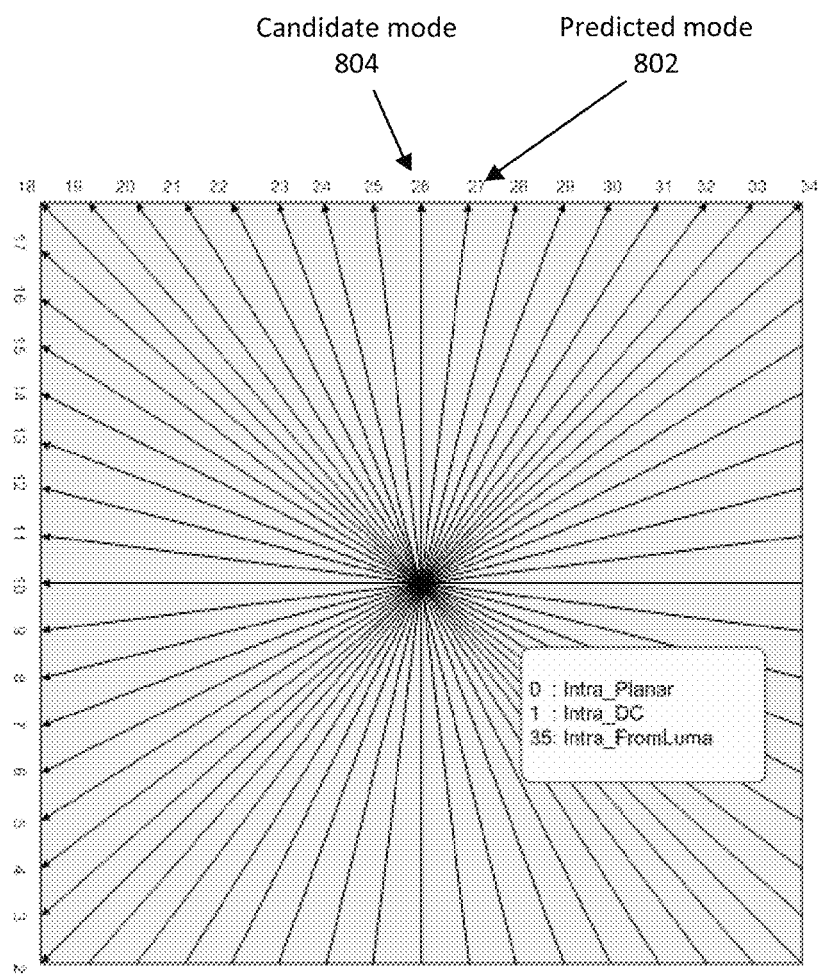
FIG. 8 is an illustrative diagram of various intra modes.

As noted previously, in general, BENT includes up to 33 directional intra prediction modes ("Intra_Angular" prediction modes or "directions") and, for a given PU being coded, intra prediction modes may be encoded based on previously-decoded neighboring PUs. For example, for a PU (or PB) of size N×N, a total of 4N+1 spatially neighboring samples may be used for prediction purposes. The Intra_Angular directional modes may be labeled by an index k ranging from 2 to 34 so that Intra_Angular[k] specifies a specific directional intra coding mode (e.g., Intra_Angular[26] corresponds to vertical intra prediction). The remaining, non-directional, intra coding modes are Intra_Planar (k=0) and Intra_DC where Intra_Planar (k=1) uses average values of two linear predictions based on four corner reference samples, and Intra_DC uses an average of reference samples for prediction. For example, FIG. 8 illustrates the directions corresponding to all thirty-three (33) HEVC Intra_Angular modes.

Having generated a list of intra mode candidates at block 310, process 300 may continue at block 314 where performed predicted intra mode may be determined for the current PU in response to the intra mode candidates. For example, in various implementations, SVC codec 406 may use known techniques to compare the result of separately applying each of the thirty-five (35) HEVC intra modes to the current PU to determine which intra mode results in a lowest rate-distortion cost for the current PU. In some implementations, SVC codec 406 may use known techniques to compare the result of separately applying each of a sub-set of the thirty-five (35) HEVC intra modes to the current PU to determine which intra mode results in a lowest rate-distortion cost for the current PU. In various implementations, block 314 may be undertaken using hardware logic, such as fixed function circuitry, to perform the arithmetic operations needed to determine rate-distortion costs. Moreover, such as hardware logic may permit parallel determination of the rate-distortion costs for various combinations of applying the intra mode candidates to the current PU.

In accordance with the present disclosure, block 314 may result in a predicted intra mode that corresponds to one of the intra modes in the candidate intra mode list generated at block 310. If the predicted intra mode corresponds to a candidate intra mode then SVC codec 406 may use EL encoder 204 to place an indicator in bitstream 239 to specify that intra mode for the current PU. In various implementations, the indicator may be an index. For instance, in the example of scheme 700 where there are three candidate intra modes, a 2-bit index value may be used to indicate the MPM for the current PU. In general, a 2-bit index field may be sufficient to indicate one of two, three or four candidate intra modes and may be used to more efficiently communicate the predicted intra mode than the 5-bit index value that would be required to indicate each of the thirty-five HEVC intra modes. For more than four but less than nine candidate intra modes, a 3-bit index field may be sufficient. However, the present disclosure is not limited to any particular number of candidate intra modes.

In accordance with the present disclosure, block 314 may result in a predicted intra mode that does not correspond to one of the intra modes in the candidate intra mode list generated at block 310. In various implementations, if block 314 results in a predicted intra mode that is similar to a particular one of the candidate intra modes, then the predicted intra mode may be indicated by providing the index corresponding to the particular candidate intra mode along with a value corresponding to the difference between the predicted intra mode and the particular candidate intra mode. For example, referring to FIG. 8, if the predicted intra mode 802 for the current PU is Infra Angular[27] and does not correspond directly to one of the candidate intra modes but one of the candidate intra modes 804 is Intra_Angular[26], then SVC codec 406 may use EL encoder 204 to place an indicator in bitstream 239 corresponding to candidate intra mode 804 along with a value of one (1) representing the difference between modes 802 and 804 (e.g., (mode 27−mode 26)=1). Providing both the MPM index and a difference value may be used to more efficiently communicate the predicted intra mode than the 5-bit index value that would be required to indicate each of the thirty-five HEVC intra modes.

In accordance with the present disclosure, block 314 may result in a predicted intra mode that does not correspond to and is not similar to one of the intra modes in the candidate intra mode list generated at block 310. In various implementations, if block 314 results in a predicted intra mode that not the same as or similar to any of the candidate intra modes, then the predicted intra mode may be indicated by providing an index sufficient to specify one of thirty-five (35) intra modes. For example, a 5-bit index field may be used to specify any one of the thirty-five (35) intra modes for the current PU.

Figure 9:
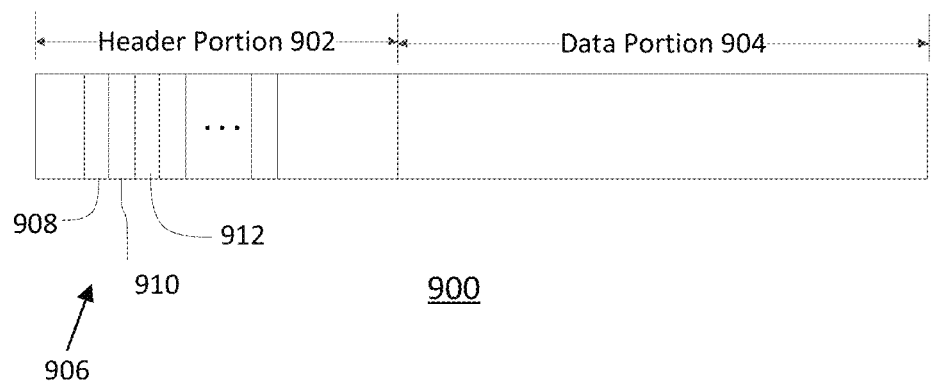
FIG. 9 is an illustrative diagram of an example bitstream.

Process 300 may conclude at block 316 where a bitstream may be formed where the bitstream includes an indication of the predicted intra mode for the current PU. For instance, FIG. 9 illustrates an example bitstream 900 that may be formed at block 316. For example, bitstream 900 may correspond to bitstream 239 as may be formed by SVC codec 406 in undertaking block 316. As depicted in FIG. 6, bitstream 900 includes a header portion 902 and a data portion 904. Header portion 902 includes one or more indicators 906. For instance, indicators 906 may include an indicator 908 whose value specifies whether or not to perform inter-layer intra mode prediction, as described herein, for a current PU.

In various implementations, when the intra mode predicted at block 314 corresponds to one of the candidate intra modes, indicators 906 may include an intra mode field or indicator 910 whose value specifies the candidate intra mode. For example, in some implementations, indicator 910 may be a 2-bit field that can be used to indicate any one of four candidate intra modes. Further, in various implementations, when intra mode predicted at block 314 is similar to one of the candidate intra modes, indicators 906 may include, in addition to intra mode field or indicator 910, a difference field or indicator 912 whose value specifies the difference between the predicted intra mode and one of the candidate intra modes.

While process 300 has been described herein in the context of FIGS. 5 and 6, the present disclosure is not limited to the performance of inter-layer intra mode prediction in which an intra mode of an EL PU is predicted from candidates derived from the co-located lower EL and/or BL blocks. Thus, in various implementations, intra modes of blocks spatially adjacent to co-located blocks may be employed as intra mode candidates. Further, in implementations where a current block in an EL corresponds to more than one block in a co-located lower EL and/or BL, intra mode candidates of various ones of the co-located blocks may be accessed at block 304.

Figure 10:
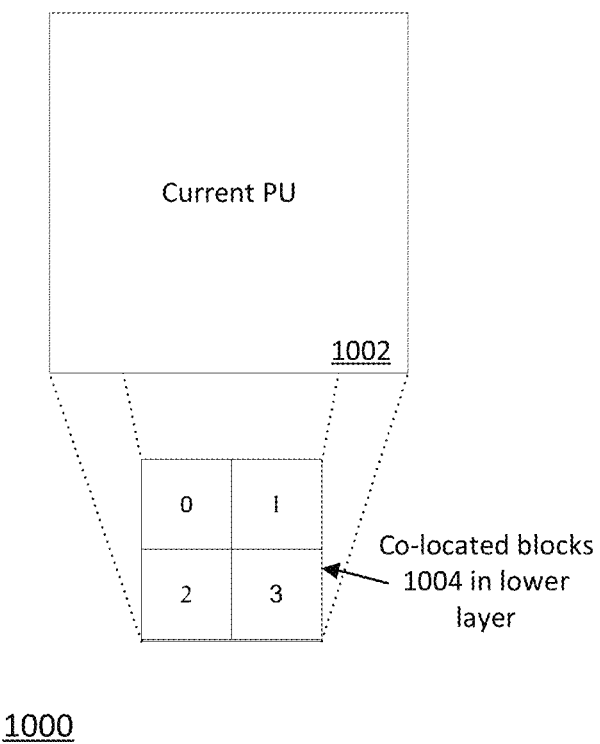
FIG. 10 is an illustrative diagram of an example coding scheme.

For example, FIG. 10 illustrates a scheme 1000 where a current PU 1002 in an El layer corresponds to four co-located blocks 1004. In various implementations, block 304 may involve accessing intra modes for only those blocks 1004 that are intra coded and/or available. For example, in some implementations, blocks 0 and 1 of blocks 1004 may be intra coded while blocks 2 and 3 may be inter coded. In such circumstances, block 304 may involve accessing intra modes for blocks 0 and/or 1 but not for blocks 2 and 3. Further, in another example, blocks 0 and 1 of blocks 1004 may have been intra coded already while coding (either intra or inter) may not have been applied yet to blocks 2 and 3. In such circumstances, block 304 may also involve accessing intra modes for blocks 0 and/or 1 but not for blocks 2 and 3. In addition, in various implementations, one or more co-located blocks may have higher priority. For instance, accessing of the intra mode of block 0 (the upper left block of co-located blocks 1004) may be prioritized over accessing the intra modes of others of blocks 1004.

Figure 11:
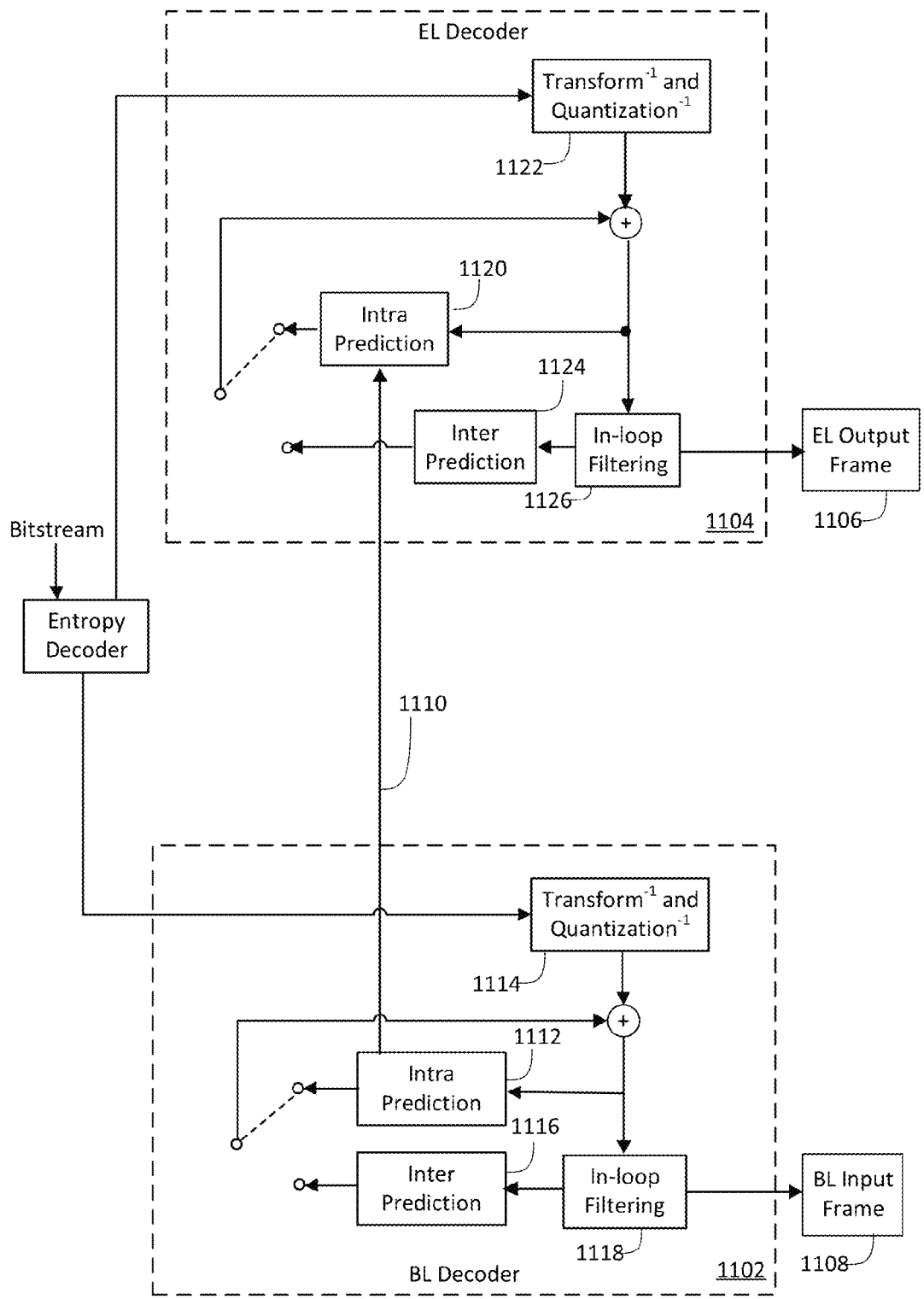
FIG. 11 is an illustrative diagram of an example decoding system.

FIG. 11 illustrates an example SVC decoding system 1100 in accordance with the present disclosure. System 1100 includes a reference BL decoder 1102 and a target EL encoder 1104 that may correspond, for example, to decoder 108 and decoder 110, respectively, of system 100. While system 1100 includes only two decoders 1102 and 1104 corresponding to two SVC coding layers, any number of SVC coding layers and corresponding decoders may be utilized in accordance with the present disclosure in addition to those depicted in FIG. 11. For example, additional decoders corresponding to additional enhancement layers may be included in system 1100 and may interact with the BL decoder 1102 in a similar manner to that to be described below with respect to EL decoder 1104.

When employing system 1100 to undertake SVC coding, a picture or image frame in the enhancement layer, such as EL output frame 1106, may be inter predicted by EL decoder 1104 from a picture such as BL output frame 1108 as processed by BL decoder 1102 or from other pictures in the same enhancement layer that were previously encoded by EL decoder 1104. As will be described in greater detail below, when undertaking inter-layer intra mode prediction operations using system 1100, intra modes for blocks of pictures in layer 1104, such as EL output frame 1106, may be predicted using intra mode candidates 1110 provided by BL decoder 1102. Candidates 1110 may be obtained from an intra prediction module 1112 of BL decoder 1102. BL decoder 1102 also includes an inverse transform and quantization module 1114, an inter prediction module 1116, and an in-loop filtering module 1118.

As described in greater detail below, the intra mode candidates 1110 may be provided to an intra prediction module 1120 of EL decoder 1104. EL decoder 1104 also includes an inverse transform and quantization module 1122, an inter prediction module 1124, and an in-loop filtering module 1126. When operated to undertake inter-layer intra mode prediction, EL decoder 1104 may use the candidate intra modes 1110 when predicting intra modes for various blocks of EL output frame 1106.

Various components of the systems described herein may be implemented in software, firmware, and/or hardware and/or any combination thereof. For example, various components of system 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, systems 200 and 1100 may include additional components such as bitstream multiplexer modules and the like that have not been depicted in FIGS. 2 and 11 in the interest of clarity.

Figure 12:
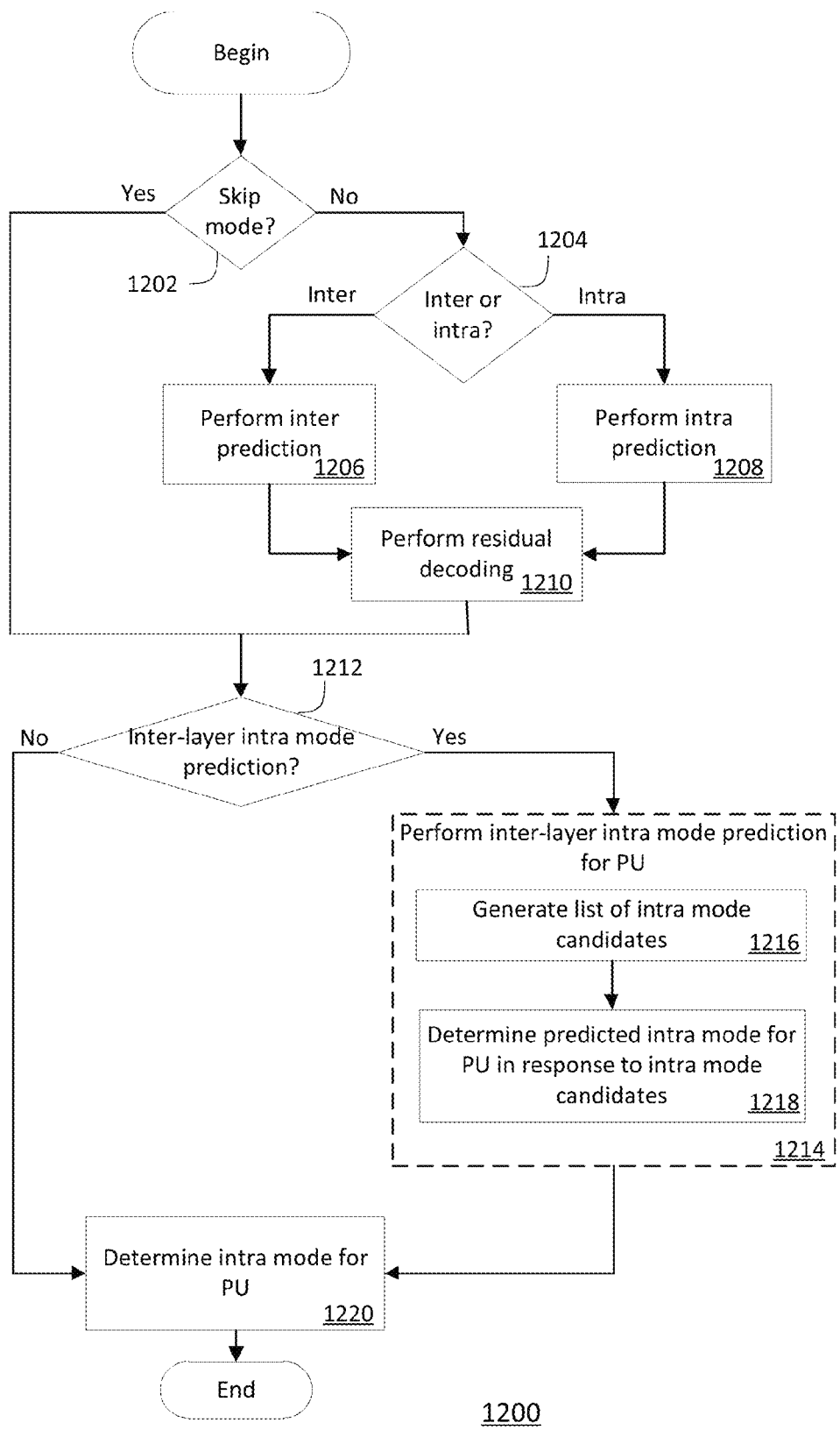
FIG. 12 is a flow diagram illustrating an example process.

FIG. 12 illustrates a flow diagram of an example process 1200 according to various implementations of the present disclosure. Process 1200 may include one or more operations, functions or actions as illustrated by one or more of blocks 1202, 1204, 1206, 1208, 1210, 1212, 1214, 1216, 1218 and 1220 of FIG. 12. By way of non-limiting example, process 1200 may form at least part of a scalable video coding process for a portion of an EL layer (e.g., a PU in this implementation) as undertaken by decoder system 1100. Further, process 1200 will also be described herein in reference to coding an enhancement layer PU using the scalable video coding system 400 of FIG. 4 where SVC codec module 406 may instantiate decoder system 1100, and to example bitstream 900 of FIG. 9.

Process 1200 may begin at block 1202 where a determination may be made as to whether to undertake skip mode for a current EL PU being decoded in which the current PU would be decoded based on one or more previously decoded PUs. In various implementations, SVC codec 406 may undertake block 1202 in response to the value of an indicator received in header portion 902 of bitstream 900. For instance, if the indicator has a first value (e.g., one) then SVC codec 406 may determine to undertake skip mode for the current PU. If, on the other hand, the indicator has a second value (e.g., zero) then SVC codec 406 may determine to not undertake skip mode for the current PU.

If block 1202 results in a negative determination then process 1200 may proceed to block 1204 where a determination may be made regarding whether to perform intra or inter coding for the PU. If intra prediction is chosen then process 1200 may proceed to block 1208 where intra prediction may be performed using known intra prediction techniques. If inter prediction is chosen then process 1200 may proceed to block 1206 where inter prediction may be performed using known inter prediction techniques. In various implementations, SVC codec 406 may undertake blocks 1204, 1206, and 1208 using, for example, intra prediction module 1130 of decoder 1104 to undertake block 1208, and inter prediction module 1124 of decoder 1104 to undertake block 1206. Process 1200 may then continue at block 1210 where residual decoding may be undertaken using known decoding techniques and the results of either block 1206 or 1208.

Returning to discussion of block 1202, if block 1202 results in a positive determination, and skip mode is invoked for the PU, then process 1200 may proceed to block 1212 where a determination may be made as to whether to perform inter-layer intra mode prediction for the current PU. In various implementations, SVC codec 406 may undertake block 1212 in response to the value of indicator 908 received in header portion 902 of bitstream 900. For instance, if indicator 908 has a first value (e.g., one) then SVC codec 406 may determine to undertake inter-layer intra mode prediction for the current PU. If, on the other hand, indicator 908 has a second value (e.g., zero) then SVC codec 406 may determine to not undertake inter-layer intra mode prediction for the current PU.

If block 1212 results in a positive determination then process 1200 may proceed to block 1214 where inter-layer intra mode prediction may be performed for the current PU in a manner similar to that described above with respect to process 300. For example, block 1214 may involve generating a list of candidate modes [block 1216] as described in process 300 where the candidate intra modes includes at least one candidate intra mode from a lower layer such as a lower EL or a BL. Block 1214 may then include determining a predicted intra mode for the PU in response to the intra mode candidates.

In various implementations, SVC codec 406 may undertake block 1214 in response to indicator 908 having a first value (e.g., one). In various implementations, where, during encoding (process 300) a predicted intra mode matched a candidate mode, SVC codec 406 may implement block 1214 by accessing the value of indicator 910 and comparing that index value to the candidate intra modes developed, at block 1216, using the MPM algorithm described above with respect to process 300. In some implementations, where, during encoding (process 300) a predicted intra mode was determined to be similar to a candidate mode, SVC codec 406 may implement block 1214 by accessing the value of indicator 910 and comparing that index value to the candidate intra modes developed, at block 1216, using the MPM algorithm described earlier, and by accessing indicator 912 to determine the difference value. Process 800 may then conclude at block 1220 where the intra mode for the current PU may be determined based at least in part on the results of block 1214.

While process 1200 is described herein as a decoding process for an EL PU, the present disclosure is not limited to the performance of inter-layer intra mode prediction at the PU level. Thus, in various implementations, process 1200 may also be applied to a CU or to a TU. Further, as noted previously, all inter-layer intra mode prediction processes described herein including process 1200 may be applied in the context of any combination of temporal, spatial, and/or quality scalable video coding.

While implementation of example processes 300 and 1200, as illustrated in FIGS. 3 and 12, may include the undertaking of all blocks shown in the order illustrated, the present disclosure is not limited in this regard and, in various examples, implementation of processes 300 and 1200 may include the undertaking of only a subset of the blocks shown and/or in a different order than illustrated.

In addition, any one or more of the blocks of FIGS. 3 and 12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the blocks shown in FIGS. 3 and 12 in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of video systems 100, 200, and 1100 and/or SVC codec module 406.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
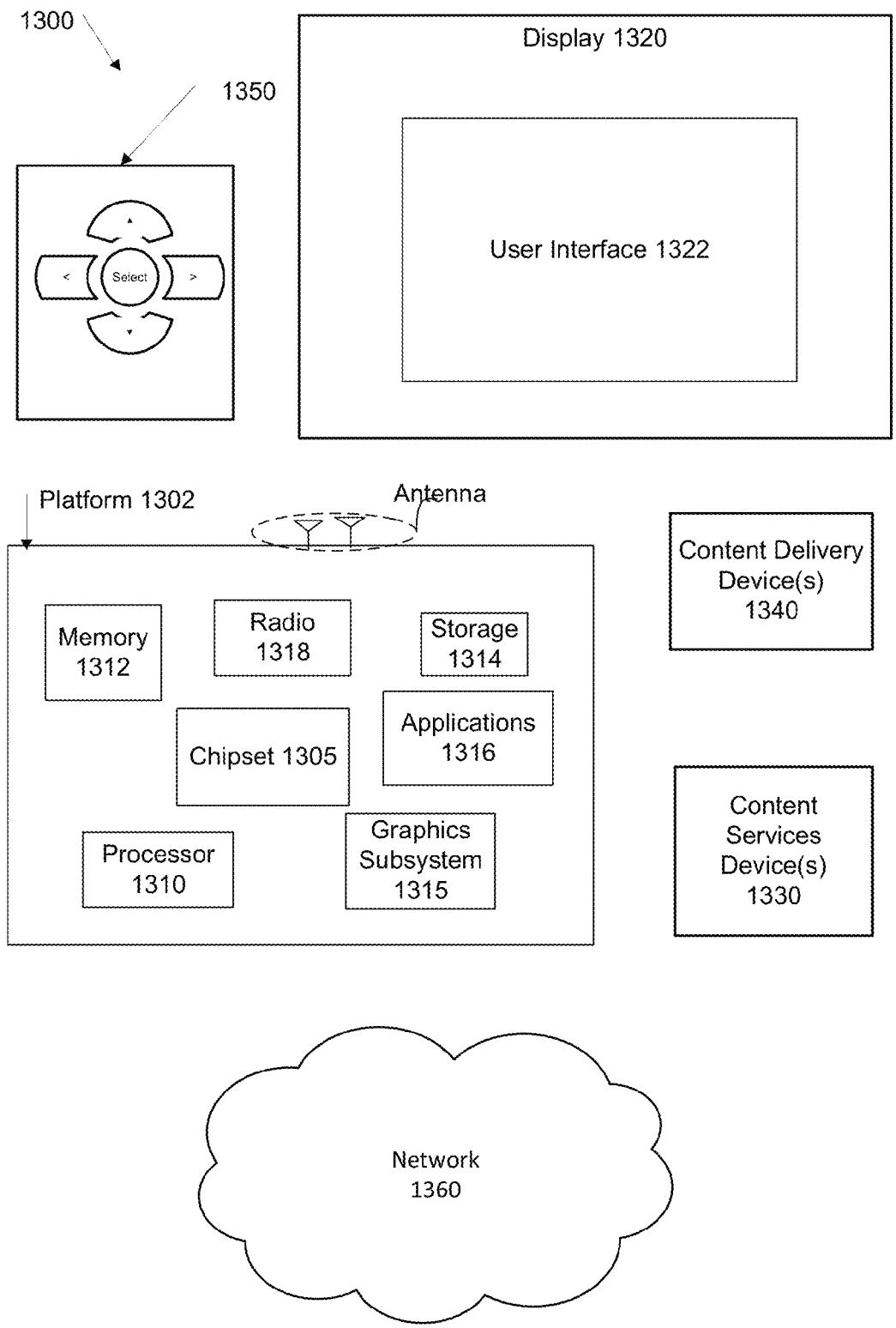
FIG. 13 is an illustrative diagram of an example system.

FIG. 13 illustrates an example system 1300 in accordance with the present disclosure. In various implementations, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
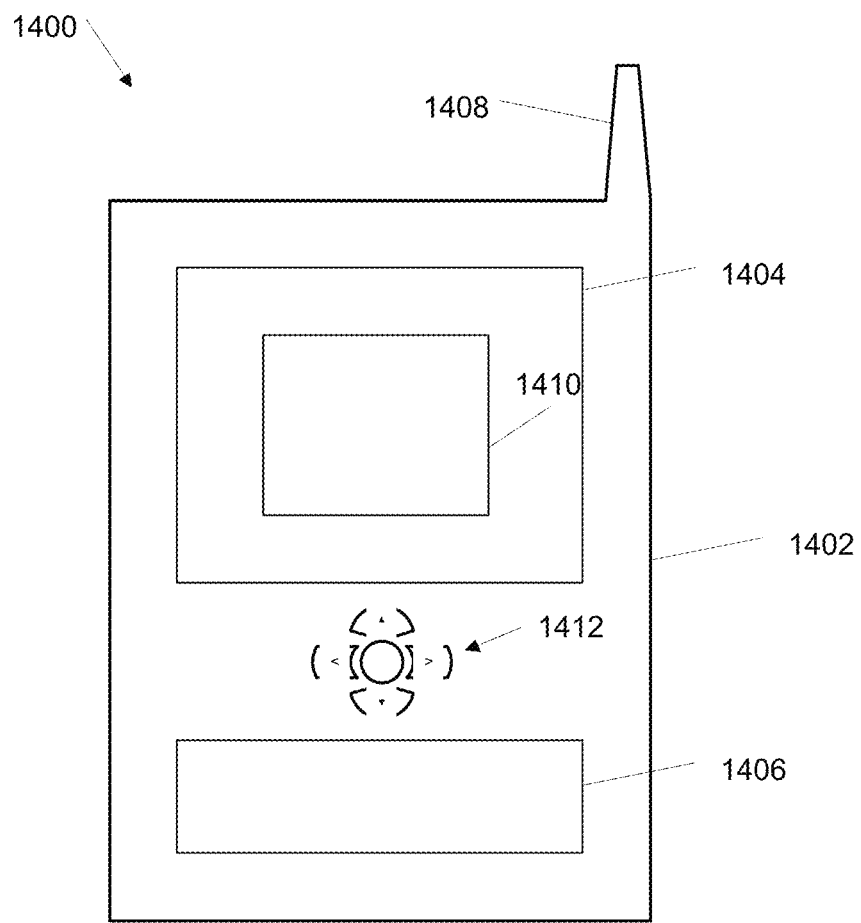
FIG. 14 illustrates an example device, all arranged in accordance with at least some implementations of the present disclosure.

As described above, system 1300 may be embodied in varying physical styles or form factors. FIG. 14 illustrates implementations of a small form factor device 1400 in which system 1400 may be embodied. In various embodiments, for example, device 1400 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing 1402, a display 1404, an input/output (I/O) device 1406, and an antenna 1408. Device 1400 also may include navigation features 1412. Display 1404 may include any suitable display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method for performing video coding, comprising:
at an enhancement layer (EL) video decoder having one or more processors:
obtaining, by the one or more processors, one or more first intra mode candidates that were used on at least one of a lower level EL frame and a base layer (BL) frame and that are both different from an EL frame, the first intra mode candidates being used to calculate predictions based on pixel data on only the same frame as a block being predicted; and
determining, by the one or more processors, a predicted intra mode for a current block of the EL frame comprising:
using the obtained one or more first intra mode candidates as candidates on the EL frame because the one or more first intra mode candidates were used as a candidate on at least one of the lower level EL frame or the base layer (BL) frame, and
selecting the predicted intra mode to calculate predictions of the current block and selected among all intra mode candidates of the current block of the EL frame including the obtained first intra mode candidates.

2. The method of claim 1, comprising:
determining one or more co-located blocks of the lower level EL frame or BL frame or both and that are co-located to the current frame; and
obtaining the one or more first intra mode candidates that are intra modes of the one or more co-located blocks of the lower level EL frame and/or the BL frame to be used as candidates on the EL frame.

3. The method of claim 2, wherein the one or more first intra mode candidates further comprise intra modes of one or more blocks spatially adjacent to the co-located blocks.

4. The method of claim 1, wherein determining the predicted intra mode comprises determining the predicted intra mode for the current block in response, at least in part, to the one or more first intra mode candidates, and to one or more second intra mode candidates obtained from at least one block spatially adjacent to the current block in the EL frame.

5. The method of claim 1, further comprising:
accessing one or more indicators in a bitstream that indicates which of the first intra modes was used as a predicted intra mode at an encoder and for the current block; and
determining the predicted intra mode by using the first intra mode indicated by the indicators as a candidate of the El frame at the decoder.

6. The method of claim 5, wherein the one or more indicators comprises an intra mode index that specifies one of the first intra mode candidates corresponding to the predicted intra mode for the current block.

7. The method of claim 5, wherein the one or more indicators further comprises another indicator specifying a difference between one of the first intra mode candidates and the predicted intra mode for the current block.

8. The method of claim 1, further comprising generating a list of intra mode candidates including the first intra mode candidates.

9. The method of claim 8, wherein the list of intra mode candidates includes an indication of a priority of each of the intra mode candidates, wherein an intra mode candidate of a layer closer to the EL has a higher priority than that of an intra mode candidate of a layer further from the EL, and wherein an intra mode of an above adjacent block in the EL has a higher priority than intra modes of other neighboring blocks in the EL.

10. A non-transitory machine-readable medium comprising a plurality of instructions that in response to being executed on a computing device, cause the computing device to:
obtain, by one or more processors, one or more first intra mode candidates that were used on at least one of a lower level EL frame and a base layer (BL) frame and that are both different from an EL frame, the first intra mode candidates being used to calculate predictions based on pixel data on only the same frame as a block being predicted; and
determining, by the one or more processors, a predicted intra mode for a current block of the EL frame comprising:
using the obtained one or more first intra mode candidates as candidates on the EL frame because the one or more first intra mode candidates were used as a candidate on at least one of the lower level EL frame or the base layer (BL) frame, and
selecting the predicted intra mode to calculate predictions of the current block and selected among all intra mode candidates for the current block of the EL frame including the obtained first intra mode candidates.

11. The non-transitory machine-readable medium of claim 10, wherein the instructions cause the computing device to operate by:
determining one or more co-located blocks of the lower level EL frame or BL frame or both and that are co-located to the current frame; and
obtaining the one or more first intra mode candidates that are intra modes of the one or more co-located blocks of the lower level EL frame and/or the BL frame to be used as candidates on the EL frame.

12. The non-transitory machine-readable medium of claim 11, wherein the one or more first intra mode candidates further comprise intra modes of one or more blocks spatially adjacent to the co-located blocks.

13. The non-transitory machine-readable medium of claim 10, wherein determining the predicted intra mode comprises determining the predicted intra mode for the current block in response, at least in part, to the one or more first intra mode candidates, and to one or more second intra mode candidates obtained from at least one block spatially adjacent to the current block in the EL frame.

14. The non-transitory machine-readable medium of claim 10, further comprising one or more instructions that in response to being executed on the computing device, cause the computing device to access one or more indicators in a bitstream that indicates which of the first intra modes was used as a predicted intra mode at an encoder and for the current block; and
 determining the predicted intra mode by using the first intra mode indicated by the indicators as a candidate of the El frame at the decoder.

15. The non-transitory machine-readable medium of claim 14, wherein the one or more indicators comprises an intra mode index that specifies one of the first intra mode candidates corresponding to the predicted intra mode for the current block.

16. The non-transitory machine-readable medium of claim 14, wherein the one or more indicators further comprises another indicator specifying a difference between one of the first intra mode candidates and the predicted intra mode for the current block.

17. The non-transitory machine-readable medium of claim 10, further comprising one or more instructions that in response to being executed on the computing device, cause the computing device to generate a list of intra mode candidates including the first intra mode candidates.

18. The non-transitory machine-readable medium of claim 17, wherein the list of intra mode candidates includes an indication of a priority of each of the intra mode candidates, wherein an intra mode candidate of a layer closer to the EL has a higher priority than that of an intra mode candidate of a layer further from the EL, and wherein an intra mode of an above adjacent block in the EL has a higher priority than intra modes of other neighboring blocks in the EL.

19. An apparatus, comprising:
 memory to store one or more first intra mode candidates that were used on at least one of a lower level EL frame and a base layer (BL) frame and that are both different from an EL frame, the first intra mode candidates being used to calculate predictions based on pixel data on only the same frame as a block being predicted; and
 a processor operating a coder to access the memory and determine a predicted intra mode for a current block of the enhancement layer (EL) frame comprising:
  using the one or more first intra mode candidates as candidates on the EL frame because the one or more first intra mode candidates were used as a candidate on at least one of the lower level EL frame or the base layer (BL) frame, and
  selecting the predicted intra mode to calculate predictions of the current block and selected among all intra mode candidates for the current block of the EL frame including the obtained first intra mode candidates.

20. The apparatus of claim 19, comprising:
 determining one or more co-located blocks of the lower level EL frame or BL frame or both and that are co-located to the current frame; and
 obtaining the one or more first intra mode candidates that are intra modes of the one or more co-located blocks of the lower level EL frame and/or the BL frame to be used as candidates on the EL frame.

21. The apparatus of claim 20, wherein the one or more first intra mode candidates further comprise intra modes of one or more blocks spatially adjacent to the co-located blocks.

22. The apparatus of claim 19, wherein determining the predicted intra mode comprises determining the predicted intra mode for the current block based, at least in part, on the one or more first intra mode candidates, and to one or more second intra mode candidates obtained from at least one block spatially adjacent to the current block in the EL frame.

23. The apparatus of claim 19, further comprising the coder to access one or more indicators in a bitstream, wherein determining the predicted intra mode comprises determining the predicted intra mode based on the one or more indicators.

24. The apparatus of claim 23, wherein the one or more indicators comprises an indicator corresponding to a candidate intra mode index, wherein the candidate intra mode index specifies one of the first intra mode candidates corresponding to the predicted intra mode for the current block.

25. The apparatus of claim 23, wherein the one or more indicators further comprises another indicator specifying a difference between one of the first intra mode candidates and the predicted intra mode for the current block.

26. The apparatus of claim 19, further comprising the coder to generate a list of intra mode candidates including the first intra mode candidates.

27. The apparatus of claim 26, wherein the list of intra mode candidates includes an indication of a priority of each of the intra mode candidates, wherein an intra mode candidate of a layer closer to the EL has a higher priority than that of an intra mode candidate of a layer further from the EL, and wherein an intra mode of an above adjacent block in the EL has a higher priority than intra modes of other neighboring blocks in the EL.

28. A method for performing video coding, comprising, at an enhancement layer (EL) video encoder having one or more processors:
 obtaining, by the one or more processors, one or more first intra mode candidates that were used on at least one of a lower level EL frame and a base layer (BL) frame and that are both different from an EL frame, the first intra mode candidates being used to calculate predictions based on pixel data on only the same frame as a block being predicted; and
 determining, by the one or more processors, a predicted intra mode for a current block of the EL frame comprising:
  using the obtained one or more first intra mode candidates as candidates on the EL frame because the one or more first intra mode candidates were used as a candidate at least one of the lower level EL frame or the base layer (BL) frame, and
  selecting the predicted intra mode to calculate predictions of the current block and selected among all intra mode candidates of the current block of the EL frame including the obtained first intra mode candidates.

29. The method of claim 28, wherein the one or more first intra mode candidates comprise intra modes of one or more co-located blocks of the lower level EL frame and/or the BL frame.

30. The method of claim 29, wherein the one or more first intra mode candidates further comprise intra modes of one or more blocks spatially adjacent to the co-located blocks.

31. The method of claim 28, wherein determining the predicted intra mode comprises determining the predicted intra mode for the current block based, at least in part, on the one or more first intra mode candidates, and on one or more second intra mode candidates obtained from at least one block located spatially adjacent to the current block in the EL frame.

32. The method of claim 28, further comprising generating one or more indicators of a bitstream, the one or more indicators specifying the predicted intra mode for the current block.

33. The method of claim 32, wherein the one or more indicators comprises an indicator specifying a candidate intra mode index, and wherein the candidate intra mode index specifies one of the first intra mode candidates corresponding to the predicted intra mode for the current block.

34. The method of claim 32, wherein the one or more indicators further comprises another indicator specifying a difference between one of the first intra mode candidates and the predicted intra mode for the current block.

35. The method of claim 28, further comprising generating a list of intra mode candidates including the first intra mode candidates, wherein the list of intra mode candidates includes an indication of a priority of each of the intra mode candidates, wherein an intra mode candidate of a layer closer to the EL has a higher priority than that of an intra mode candidate of a layer further from the EL, and wherein an intra mode of an above adjacent block in the EL has a higher priority than intra modes of other neighboring blocks in the EL.

36. A non-transitory machine-readable medium comprising a plurality of instructions that in response to being executed on a computing device, cause the computing device to:
obtain one or more first intra mode candidates that were used on at least one of a lower level EL frame and a base layer (BL) frame and that are both different from an EL frame, the first intra mode candidates being used to calculate predictions based on pixel data on only the same frame as a block being predicted; and
determining, by the one or more processors, a predicted intra mode for a current block of the EL frame comprising:
using the obtained one or more first intra mode candidates as candidates on the EL frame because the one or more first intra mode candidates were used as a candidate on at least one of the lower level EL frame or the base layer (BL) frame, and
selecting the predicted intra mode to calculate predictions of the current block and selected among all intra mode candidates of the current block of the EL frame including the obtained first intra mode candidates.

37. The non-transitory machine-readable medium of claim 36, wherein the instructions cause the computing device to operate by:
determining one or more co-located blocks of the lower level EL frame or BL frame or both and that are co-located to the current frame; and
obtaining the one or more first intra mode candidates that are intra modes of the one or more co-located blocks of the lower level EL frame and/or the BL frame, or intra modes of one or more blocks spatially adjacent to the co-located blocks to be used as candidates on the EL frame.

38. The non-transitory machine-readable medium of claim 36, wherein determining the predicted intra mode comprises determining the predicted intra mode for the current block based, at least in part, on the one or more first intra mode candidates, and on one or more second intra mode candidates obtained from at least one block located spatially adjacent to the current block in the EL frame.

39. The non-transitory machine-readable medium of claim 36, further comprising one or more instructions that in response to being executed on the computing device, cause the computing device to generate one or more indicators of a bitstream, the one or more indicators specifying the predicted intra mode for the current block.

40. The non-transitory machine-readable medium of claim 39, wherein the one or more indicators comprises an indicator specifying a candidate intra mode index, and wherein the candidate intra mode index specifies one of the first intra mode candidates corresponding to the predicted intra mode for the current block.

41. The non-transitory machine-readable medium of claim 39, wherein the one or more indicators further comprises another indicator specifying a difference between one of the first intra mode candidates and the predicted intra mode for the current block.

42. The non-transitory machine-readable medium of claim 36, further comprising one or more instructions that in response to being executed on the computing device, cause the computing device to generate a list of intra mode candidates including the first intra mode candidates, wherein the list of intra mode candidates includes an indication of a priority of each of the intra mode candidates, wherein an intra mode candidate of a layer closer to the EL has a higher priority than that of an intra mode candidate of a layer further from the EL, and wherein an intra mode of an above adjacent block in the EL has a higher priority than intra modes of other neighboring blocks in the EL.

* * * * *